United States Patent [19]

Dormish et al.

[11] Patent Number: 5,719,252
[45] Date of Patent: Feb. 17, 1998

[54] UNFILLED TWO-COMPONENT POLYURETHANE ADHESIVE

[75] Inventors: Jeffrey F. Dormish, Hudson, Ohio; Douglas Vanboxmeer, Camlachie, Canada

[73] Assignee: Bayer Corporation, Pittsburgh, Pa.

[21] Appl. No.: 768,721

[22] Filed: Dec. 18, 1996

[51] Int. Cl.$^6$ .................... C09J 175/08; C08G 18/32; C08G 18/48; C08G 18/50
[52] U.S. Cl. .................... 528/65; 528/60; 528/61; 528/64; 528/66; 528/67; 528/76; 528/77; 528/79; 528/85; 528/905
[58] Field of Search .................... 528/60, 61, 64, 528/65, 66, 67, 76, 77, 79, 85, 905

[56] References Cited

U.S. PATENT DOCUMENTS

| | | | |
|---|---|---|---|
| 3,714,127 | 1/1973 | Fabris et al. | 260/77.5 AM |
| 3,812,003 | 5/1974 | Larson et al. | 161/156 |
| 3,935,051 | 1/1976 | Bender et al. | 156/331 |
| 3,979,364 | 9/1976 | Rowton | 260/77.5 AM |
| 4,058,506 | 11/1977 | Vaeth et al. | 528/65 |
| 4,156,064 | 5/1979 | Falkenstein et al. | 528/46 |
| 4,336,298 | 6/1982 | Schwarz | 428/285 |
| 4,371,684 | 2/1983 | Quiring et al. | 528/65 |
| 4,444,976 | 4/1984 | Rabito | 528/60 |
| 4,552,934 | 11/1985 | Rabito et al. | 525/458 |
| 4,728,710 | 3/1988 | Goel | 528/58 |
| 4,743,672 | 5/1988 | Goel | 528/44 |
| 4,923,756 | 5/1990 | Chung et al. | 428/423.7 |
| 4,994,540 | 2/1991 | Boemer et al. | 528/44 |
| 5,109,034 | 4/1992 | Mafoti | 521/159 |
| 5,143,996 | 9/1992 | Chung et al. | 528/60 |
| 5,164,473 | 11/1992 | Dormish et al. | 528/44 |
| 5,204,439 | 4/1993 | Dormish et al. | 528/44 |
| 5,349,040 | 9/1994 | Trinks et al. | 528/75 |
| 5,470,935 | 11/1995 | Mafoti et al. | 528/65 |

FOREIGN PATENT DOCUMENTS 64-48876  2/1989  Japan .

*Primary Examiner*—Rabon Sergent
*Attorney, Agent, or Firm*—Joseph C. Gil; Richard E. L. Henderson

[57] ABSTRACT

This invention relates to a low-viscosity two-component unfilled polyurethane adhesive having a urethane content of from 10 to 18 percent by weight, based on the weight of nonfilled polyurethane polymer, based on (a) a low-viscosity isocyanate component comprising an organic polyisocyanate in a quantity sufficient to provide an isocyanate index of about 100 to about 150; and (b) a low-viscosity phase-stable curative component comprising (i) 5 to 50 equivalent percent of a polyether polyol and/or a polyether terminated by aromatic amino groups having an equivalent weight greater than 500, (ii) 30 to 95 equivalent percent of 2-methyl-1,3-propanediol, and (iii) 0 to 35 equivalent percent of a chain extender and/or crosslinker other than 2-methyl-1,3-propanediol, with the proviso that the equivalent ratio of component (b)(iii) to component (b)(ii) is no more than about 0.6.

7 Claims, No Drawings

UNFILLED TWO-COMPONENT POLYURETHANE ADHESIVE

BACKGROUND OF THE INVENTION

The present invention relates to an unfilled low-viscosity two-component polyurethane adhesive comprising an organic polyisocyanate component and an isocyanate-reactive curative component. The curative component comprises a phase-stable blend of a relatively high equivalent weight isocyanate-reactive polyether component with 2-methyl-1,3-propanediol and other optional chain extenders or crosslinkers, including low molecular weight diamines or triamines that impart sag resistance.

Urethane-based adhesives are known for use in joining together various plastic materials. Although certain preformed polyurethanes can be used as adhesives by applying heat (for example, U.S. Pat. No. 4,156,064), the preferred urethane adhesives are typically two-component urethane-based adhesives comprised of an isocyanate component and an isocyanate-reactive curative component. Such adhesives are preferred over other adhesives, at least in part because of outstanding bond strength, flexibility, and resistance to shock and fatigue.

Various approaches for preparing improved two-component urethane adhesives have been described. One approach uses certain special reagents to improve the properties of the adhesives. For example, the addition of certain amide acetals to the curative component improves adhesive properties by inhibiting foaming. E.g., U.S. Pat. No. 4,728,710. The use of certain special isocyanate-reactive compounds (for example, special amines, amino alcohols, and thiols) as part of the curative component also provides improved adhesives. E.g., U.S. Pat. Nos. 3,714,127, 3,812,003, 3,935,051, and 4,336,298.

It is possible to improve adhesive properties without the need for special reagents of the types described above. For example, U.S. Pat. Nos. 3,979,364 and 4,743,672 disclose two-component urethane adhesives in which the curative component contains mixtures of polyols and polyoxyalkylene polyamines. These polyamines, in which the amino groups are bound to aliphatic carbon atoms, impart sag resistance as well as improved adhesion.

Efforts to improve adhesive properties have also focused on the polyol component of the curative component. For example, U.S. Pat. No. 4,336,298 specifies the use of polyester or polyether triols having a molecular weight range of about 400 to 1000, which corresponds to an equivalent weight of no more than about 333. U.S. Pat. No. 4,444,976 specifies a curative component containing polyols having at least two hydroxyl groups and a molecular weight range of about 100 to 2000, which corresponds to an equivalent weight of no more than 1000. Higher molecular weight polyols are disclosed but only for the preparation of prepolymers used as the polyisocyanate component. U.S. Pat. No. 4,552,934 discloses a curative component containing hydroxyl terminated prepolymers prepared by the reaction of organic polyisocyanates, polyols having a molecular weight range of about 150 to 3000, and polyamines. European Patent Application 304,083 discloses an isocyanate component containing a blend of an aliphatic isocyanate and an aromatic isocyanate prepolymer and a curative component containing a polyfunctional polyether polyol having a hydroxyl number of from 100 to 1200 (corresponding to equivalent weights of about 45 to about 561), a diamine, and an optional catalyst. Higher molecular weight polyols are disclosed but only for the preparation of the prepolymers of the isocyanate component.

Japanese Patent 89/48,876 discloses a two-component urethane adhesive having a polyisocyanate component and a curative component containing a mixture of relatively high molecular weight polyols, relatively low molecular weight polyols, zeolite filler, and catalyst. The Japanese patent does not disclose any special role for 2-methyl-1,3-propanediol or suggest that the specified zeolite filler can be omitted.

European Patent Application 328,808 discloses a two-component urethane adhesive having an isocyanate-terminated urethane prepolymer component and a curative component containing a nitrogen-free polyol (preferably a low molecular weight diol) and a primary amine for sag resistance, as well as optional fillers and other additives. The European application does not suggest the importance of using a curative component containing both relatively high equivalent weight polyether polyols and 2-methyl-1,3-propanediol or other low molecular weight diol chain extenders or crosslinkers.

The use of low viscosity components in two-component adhesive systems is desirable as long as sag is not excessive. U.S. Pat. No. 4,552,934 describes the desirability of low viscosity components having viscosities of 35,000 cps (i.e., 35,000 mPa.s) for the isocyanate component and approximately 50,000 cps for the curative component. Although described as having low viscosities, both adhesive components of the patent are considerably more viscous than those of the present invention. U.S. Pat. No. 4,336,298 discloses a low viscosity hardener component having a viscosity of from 400 to 8000 mPa.s but requires a higher viscosity isocyanate component having a viscosity of from 20,000 to 55,000 mPa.s.

Two-component adhesives based on isocyanate-reactive curative blends containing relatively high equivalent weight isocyanate-reactive polyethers, low molecular weight diol chain extenders or crosslinkers, and amines have been disclosed. E.g., U.S. Pat. Nos. 4,994,540, 5,164,473, and 5,204,439. However, the curative components of such adhesives have typically been unstable with respect to separation into phases and the adhesives typically require the use of fillers to obtain optimal properties.

Unfilled two-component adhesives have been obtained by using low molecular weight diol chain lengthening agents containing carbon-carbon double or triple bonds. E.g., U.S. Pat. No. 5,349,040. Although saturated polyhydric chain extenders are disclosed, this patent does not specifically mention 2-methyl-1,3-propanediol or suggest any advantages associated with its use.

It has now surprisingly been found that unfilled isocyanate-reactive curative blends containing a relatively high equivalent weight polyether component, 2-methyl-1,3-propanediol, and optional chain extenders and/or crosslinkers other than 2-methyl-1,3-propanediol are stable to phase separation while still exhibiting low viscosity. Such blends, when used with a low viscosity polyisocyanate component, provide two-component adhesives having advantageous properties despite the absence of fillers. For example, adhesives according to the invention, although used without primer, exhibit excellent high temperature bonding strength. When low molecular weight isocyanate-reactive diamines or triamines are used as chain extenders or crosslinkers, the mixed adhesives of the invention exhibit excellent resistance to flow, or "sag", despite the fact that both reactive components are characterized by low viscosities of less than about 15,000 mPa.s.

SUMMARY OF THE INVENTION

The present invention relates to a low-viscosity two-component unfilled polyurethane adhesive having a urethane content of from 10 to 18 percent by weight (preferably 11 to 16 percent by weight and more preferably 12 to 15 percent by weight), based on the weight of nonfilled polyurethane polymer, comprising (a) a low-viscosity isocyanate component comprising an organic polyisocyanate in a quantity sufficient to provide an isocyanate index of about 100 to about 150 (preferably 115 to 140); and (b) a low-viscosity curative component that is resistant to phase separation comprising (i) about 5 to about 50 equivalent percent (preferably 5 to 20 equivalent percent), based on the total equivalents of amino and hydroxyl groups of component (b), of an isocyanate-reactive polyether having an equivalent weight greater than 500 (preferably 500 to 20,000 and more preferably 1000 to 10,000) selected from the group consisting of polyether polyols, polyethers terminated by aromatic amino groups, and mixtures thereof, (ii) about 30 to about 95 equivalent percent (preferably 50 to 95 equivalent percent and more preferably 70 to 95 equivalent percent), based on the total equivalents of amino and hydroxyl groups of component (b), of 2-methyl-1,3-propanediol, and (iii) 0 to about 35 equivalent percent (preferably 0.5 to 17 equivalent percent and more preferably 6 to 12 equivalent percent), based on the total equivalents of amino and hydroxyl groups of component (b), of one or more chain extenders and/or crosslinkers other than 2-methyl-1,3-propanediol having a molecular weight in the range of 32 to 400 (preferably a mixture of chain extenders and/or cross-linkers containing one or more isocyanate-reactive diamines or triamines having a molecular weight in the range of about 62 to 400 in a quantity sufficient to produce resistance to flow when components (a) and (b) are mixed), with the proviso that the equivalent ratio of component (b)(iii) to component (b)(ii) is no more than about 0.6 (preferably no more than about 0.5 and more preferably no more than about 0.35).

DETAILED DESCRIPTION OF THE INVENTION

Suitable polyisocyanates for use in component (a) include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such polyisocyanates include those having the formula $$Q(NCO)_n$$

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable polyisocyanates include ethylene diisocyanate; 1,4-tetramethylene diisocyanate; 1,6-hexamethylene diisocyanate; 1,12-dodecamethylene diisocyanate; cyclobutane-1,3-diisocyanate; cyclohexane-1,3- and -1,4-diisocyanate, and mixtures of these isomers; 1-isocyanato-2-isocyanatomethylcyclopentane; 1-isocyanato-1-methyl-3- and/or -4-isocyanatomethylcyclohexane ("IMCI"); 1,3- and 1,4-bis(isocyanatomethyl)cyclohexane; 1-isocyanato-3,3,5-trimethyl-5-isocyanatomethylcyclohexane ("isophorone diisocyanate" or "IPDI"; see, e.g., German Auslegeschrift 1,202,785 and U.S. Pat. No. 3,401,190); 2,4- and 2,6-hexahydrotolylene diisocyanate and mixtures of these isomers; dicyclohexylmethane-4,4'-diisocyanate ("hydrogenated MDI" or "HMDI"), including the t,t-, c,t-, and c,c-isomers thereof; dicyclohexylmethane-2,4'-diisocyanate; α,α, α', α'-tetramethyl-1,3- and/or -1,4-xylylene diisocyanate ("TMXDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; and modified polyisocyanates and isocyanate-terminated prepolymers formed from such polyisocyanates. It is also possible to use the isocyanate-containing distillation residues accumulating in the production of isocyanates on a commercial scale, optionally in solution in one or more other polyisocyanates.

Suitable modified polyisocyanates can be prepared, for example, by the reaction of organic polyisocyanates such as those described above with one or more compounds containing isocyanate-reactive groups, such as hydroxyl, amino, and thiol groups (preferably hydroxyl and/or amino groups) and having a functionality about 2 to about 6 and an equivalent weight greater than about 500, such that up to about 10 (preferably up to 5) equivalent percent of the isocyanate groups have been modified. Preferred isocyanate-reactive compounds have a functionality about 2 to about 6 and an equivalent weight greater than about 500. Examples of suitable modified polyisocyanates include modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschdften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; and modified polyisocyanates containing carbodiimide groups of the type described in U.S. Pat. No. 3,152,162.

Suitable isocyanate-terminated prepolymers can be prepared, for example, by reaction of any of the above polyisocyanates with a substoichiometric amount of an isocyanate-reactive compound, preferably a hydroxyl- or amino-containing compound, such as those disclosed below. Blends of any of the previously disclosed polyisocyanates may also be used in accordance with the present invention.

Preferred polyisocyanates (a) are those based on MDI or HMDI. Examples of such MDI-based polyisocyanates include (i) mixtures of diphenylmethane-2,4'- and/or -4,4'- diisocyanate isomers (preferably having a 2,4'-isomer content of about 5 to about 40 and most preferably 10 to 25 percent by weight), optionally in admixture with polyphenyl polymethylene polyisocyanates, wherein the diphenylmethane diisocyanate isomers comprise from about 20 to 100 percent by weight of the total polyisocyanate mixture; (ii) urethane- and/or urea-modified MDI-based di- and/or polyisocyanates in which the isocyanate groups (preferably 0 to 30 equivalent percent) can optionally be modified by reaction with one or more isocyanate-reactive hydroxyl- and/or amino-containing compounds, wherein said isocyanate-reactive compounds have a functionality of about 2 to about 6 and an equivalent weight greater than about 500 (preferably 500 to 20,000); (iii) allophanate-modified MDI-based di- and/or polyisocyanates; and (iv) dicyclohexyl-methane-2,4'- and/or -4,4'-diisocyanate, preferably the 4,4'-isomer. It is, of course, often desirable to use isocyanate-terminated prepolymers prepared from MDI-based polyisocyanates.

Mixtures of the above polyisocyanates are, of course, also suitable.

Suitable polyether polyols for use in component (b)(i) include polyethers prepared, for example, by the polymerization of epoxides such as ethylene oxide, propylene oxide, butylene oxide, tetrahydrofuran, styrene oxide, or epichlorohydrin, optionally in the presence of Lewis acids such as $BF_3$, or prepared by chemical addition of such epoxides, optionally added as mixtures or in sequence, to starting components containing reactive hydrogen atoms, such as water, alcohols, or amines. Examples of starting components include ethylene glycol, 1,3- or 1,2-propanediol, 1,2-, 1,3-, or 1,4-butanediol, trimethylolpropane, 4,4'-dihydroxydiphenylpropane, aniline, ammonia, ethanolamine, or ethylene diamine. Sucrose polyethers of the type described, for example, in German Auslegeschriften 1,176,358 and 1,064,938 may also be used according to the invention. Polyethers which contain predominantly primary hydroxyl groups (up to about 90% by weight, based on all of the hydroxyl groups in the polyether) are also suitable. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyether polyols include polyoxyalkylene polyether polyols, such as polyoxyethylene diol, polyoxypropylene diol, polyoxybutylene diol, and polytetramethylene diol, as well as polyoxypropylene polyoxyethylene triols.

Other suitable polyol polyethers for use in component (b)(i) include the so-called PHD polyols, which are prepared by reactions of organic polyisocyanates, hydrazine, and polyether polyols. U.S. Pat. No. 3,325,421 discloses a method for producing suitable PHD polyols by reacting a stoichiometric or substoichiometric quantity (relative to diamine) of polyisocyanate dissolved in a polyol having a molecular weight of at least 500 and a hydroxyl number of no more than 225. See also U.S. Pat. Nos. 4,042,537 and 4,089,835.

Suitable polyol polyethers for use in component (b)(i) also include the so-called polymer polyols, which are prepared by polymerizing styrene and acrylonitrile in the presence of a polyether. See, for example, U.S. Pat. Nos. 3,383,351, 3,304,273, 3,523,093, 3,652,639, 3,823,201, and 4,390,645.

Also suitable are so-called amine-terminated polyethers containing aromatically and/or aliphatically (preferably aromatically) bound isocyanate-reactive primary or secondary (preferably primary) amino groups. Compounds containing amino end groups can also be attached to the polyether chain through urethane or ester groups. These amine-terminated polyethers can be prepared by any of several methods known in the art. For example, amine-terminated polyethers can be prepared from polyhydroxyl polyethers (e.g., polypropylene glycol ethers) by a reaction with ammonia in the presence of Raney nickel and hydrogen (Belgian Patent 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patentschrift 1,193,671. Other methods for the preparation of polyoxyalkylene (polyether) amines are described in U.S. Pat. Nos. 3,155,728 and 3,236,895 and in French Patent 1,551,605. French Patent 1,466,708 discloses the preparation of polyethers containing secondary amino end groups. Also useful are the polyether polyamines described in U.S. Pat. Nos. 4,396,729, 4,433,067, 4,444,910, and 4,530,941.

In one method for preparing aromatic amine-terminated polyethers, relatively high molecular weight polyhydroxy-polyethers suitable for the process of the present invention may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Preferred aromatic amine-terminated polyethers include amino-polyethers obtained by the hydrolysis of compounds containing isocyanate end groups. For example, in a process disclosed in German Offenlegungsschrift 2,948,419, polyethers containing hydroxyl groups (preferably two or three hydroxyl groups) react with polyisocyanates to form isocyanate prepolymers, the isocyanate groups of which are then hydrolyzed in a second step to amino groups. Preferred amine-terminated polyethers are prepared by hydrolyzing aromatic isocyanate compounds having an isocyanate group content of from 0.5 to 40% by weight. The most preferred such polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386, 218, 4,456,730, 4,472,568, 4,501,873, 4,515,923, 4,525,534, 4,540,720, 4,578,500, and 4,565,645; European Patent Application 97,299; and German Offenlegungsschrift 2,948, 419, all the disclosures of which are herein incorporated by reference. Similar products are also described in U.S. Pat. Nos. 4,506,039, 4,525,590, 4,532,266, 4,532,317, 4,723, 032, 4,724,252, 4,855,504, 4,931,595, and 5,283,364.

Other suitable amine-terminated polyethers include aminophenoxy-substituted polyethers described, for example, in European Patent Applications 288,825 and 268,849.

Aminocrotonate-terminated derivatives of polyethers, as well as of other polyols described above, can be prepared from acetoacetate-modified polyethers as described, for example, in U.S. Pat. Nos. 5,066,824, 5,151,470, 5,231,217, and 5,356,946.

The amine-terminated polyethers can often be used as mixtures with polyols and other amine-terminated compounds. Such mixtures should preferably contain (on a statistical average) two to three isocyanate-reactive amino end groups.

Preferred compounds for use in component (b)(i) are polyether polyols, the so-called PHD polyols, polyethers terminated with aromatic amino groups, and mixtures thereof. The most preferred compounds for use in component (b)(i) include (a) polyoxypropylene polyoxyethylene triols having an equivalent weight greater than about 500 (preferably greater than 1000) and/or (b) amine-terminated polyethers prepared by first reacting a polyether containing two to four hydroxyl groups (preferably a polyoxypropylene polyoxyethylene triol having an equivalent weight greater than about 1000) with an excess of an aromatic polyisocyanate (preferably toluene diisocyanate) to form an isocyanate-terminated prepolymer and then hydrolyzing the isocyanate groups of the isocyanate-terminated prepolymer to form the amine-terminated polyether.

Component (b)(ii) must be 2-methyl-1,3-propanediol but can optionally be used in admixture with up to about 0.6 equivalents (preferably up to about 0.5 equivalents and more preferably up to about 0.35 equivalents), per equivalent of 2-methyl-1,3-propanediol, of one or more other chain extenders (i.e., other than 2-methyl-1,3-propanediol) and/or crosslinkers (b)(iii). The quantity of such other chain extenders and/or crosslinkers is, however, somewhat dependent on the composition of isocyanate-reactive polyether (b)(i). Suitable chain extenders and crosslinkers (b)(iii) contain at least two hydroxyl groups and/or primary or secondary amino groups and have molecular weights of 32 to 400. In general, chain extenders are difunctional isocyanate-reactive compounds, whereas, crosslinkers are trifunctional or higher functionality isocyanate-reactive compounds. Suitable chain extenders and/or crosslinkers, if used at all, can contain hydroxyl groups as the only isocyanate-reactive groups. Examples of suitable hydroxyl-containing chain extenders and crosslinkers include ethylene glycol, 1,2- and 1,3-propanediol, 1,4-butane-diol, 1,6-hexanediol, glycerol, trimethylolpropane, pentaerythritol, quinitol, mannitol, diethylene glycol, tdethylene glycol, tetraethylene glycol, dipropylene glycol, dibutylene glycol. Particularly preferred hydroxyl-containing chain extenders are diols such as ethylene glycol, 1,2-propanediol, and 1,4-butanediol. It is also possible to use chain extenders containing both hydroxyl and amino groups, such as diethanolamine and diisopropanolamine. Mixtures containing more than one chain extender and/or crosslinker can, of course, also be used in admixture with the 2-methyl-1,3-propanediol.

Particularly useful adhesives exhibit resistance to flow when components (a) and (b) are mixed. Suitable flow resistance can be achieved by including in component (b)(iii) as little as 0.5 equivalent percent (based on the total equivalents of amino and hydroxyl groups of component (b)) of an isocyanate-reactive amine. Suitable isocyanate-reactive amines include aliphatic, cycloaliphatic, or aromatic diamines or triamines having a molecular weight in the range of about 62 to 400. Although substantially any isocyanate-reactive diamine or triamine can be used, preferred isocyanate-reactive amines are aliphatic or cycloaliphatic diamines having only primary amino groups, particularly ethylenediamine, hexamethylenediamine, bis(4-aminocyclohexyl)methane, and 1-amino-3,3,5-trimethyl-5-aminomethylcyclohexane ("IPDA"). A most preferred diamine is 1-amino-3,3,5-trimethyl-5-aminomethylcyclohexane. Known aromatic diamines are also suitable but are less preferred. Suitable but generally less preferred isocyanate-reactive amines contain both hydroxyl and amino groups. Mixtures of such amines are, of course, also suitable.

Thiol-containing chain extenders and/or crosslinkers, although possible in principle, are much less preferred for use in component (b)(iii).

The isocyanate-reactive compounds of component (b) of the invention are described in terms of equivalent weight, which can be calculated from experimentally determined hydroxyl numbers (and/or similarly determined amine numbers) of a particular component using the well-known relationship described by the formula $$\text{equivalent weight} = \frac{56,100}{\text{hydroxyl (or amine) number}}$$

The corresponding molecular weight of a particular component can, of course, be determined by multiplying the equivalent weight by the functionality of the component. A critical feature of the invention is the use of a blend of a relatively high equivalent weight isocyanate-reactive component (b)(i) with 2-methyl-1,3-propanediol (b)(ii), as well as optional chain extenders and/or crosslinkers (b)(iii), to obtain a curative blend that is stable to phase separation ("phase stable") and provides adhesives exhibiting excellent high temperature bonding strength, as well as resistance to sag when suitable diamines or triamines are included.

The relative quantities of the individual compounds of component (b) are selected in such a way that the isocyanate-reactive groups of component (b)(i) comprise about 5 to about 50 equivalent percent (preferably 5 to 20 equivalent percent), the hydroxyl groups of 2-methyl-1,3-propanediol (b)(ii) comprise about 30 to about 95 equivalent percent (preferably 50 to 95 equivalent percent and more preferably 70 to 95 equivalent percent), and the isocyanateoreactive groups of optional component (b)(iii) comprise up to about 35 equivalent percent (preferably 0.5 to 17 equivalent percent and more preferably 6 to 12 equivalent percent) of the total equivalents of amino and hydroxyl groups of component (b). The maximum amount of component (b)(iii) that can be blended with 2-methyl-1,3-propanediol (b)(ii) and still give phase-stable mixtures is somewhat dependent on the composition of polyether (b)(i) with which it is used. In general, however, phase-stable mixtures can contain up to about 0.6 equivalents (preferably up to about 0.5 equivalents and more preferably up to about 0.35 equivalents) of other chain extenders or crosslinker per equivalent of 2-methyl-1,3-propanediol.

When included to provide flow resistance, isocyanate-reactive diamines and triamines are used as all or a part of component (b)(iii) in amounts that are at least sufficient to produce adequate resistance to flow when components (a) and (b) are mixed. In general, the amount of the diamine and/or triamine is selected to provide 0.5 to 20 equivalent percent (more preferably 1 to 12 equivalent percent) of the total isocyanate-reactive groups of component (b). It is possible for component (b)(iii) to consist entirely of such isocyanate-reactive diamines and/or triamines as long as component (b) contains no more than about 15 equivalent percent (preferably 6 to 12 equivalent percent) of such amines.

Fillers are not needed for the adhesives of the invention. However, for reasons relating to cost or viscosity adjustment, for example, it is possible to add certain fillers in quantities not generally considered sufficient to have a significant effect on adhesive properties (for example, less than about 10 percent by weight of filler based on the total quantity of the polyurethane adhesive). Suitable fillers, if used at all, include silicate-containing minerals, such as antigorite, serpentine, hornblends, amphiboles, chrysotile, talc, mica, and kieselguhr; metal oxides such as kaolin, aluminum oxides, titanium oxides, and iron oxides; metal salts such as chalk and heavy spar (barium sulfate); inorganic pigments such as cadmium sulfide and zinc sulfide; and glass, asbestos powder, carbon fibers, and the like.

In addition to the reactants and any fillers described above, auxiliary agents and additives may optionally be used in the preparation of the adhesives of the invention. Suitable auxiliary agents and additives may include, for example, catalysts for the polyisocyanate-polyaddition reaction, drying agents, surface-active additives, anti-foaming agents, pigments, dyes, UV stabilizers, plasticizers, and fungistatic or bacterio-static substances, such as those described in European Patent Application 81,701 at column 6, line 40, to column 9, line 31.

Both the isocyanate component and the curative component of the present invention are characterized by low viscosities, a characteristic that facilitates bulk handling. As used herein, the term "low viscosity" refers to a Brookfield viscosity at 25° C. of less than about 15,000 mPa.s. Each component used in the present invention is characterized by a viscosity at 25° C. of less than 15,000 mPa.s. Despite the use of such low-viscosity components, the mixed adhesive exhibits excellent resistance to sag when diamines and/or triamines are present in component (b)(iii).

In the practice of the invention the organic isocyanate component is mixed with the curative isocyanate-reactive component in a predetermined ratio designed to provide an isocyanate index of from about 100 to about 150. The term "isocyanate index" is defined as the quotient, multiplied by 100, of the number of isocyanate groups divided by the number of isocyanate-reactive groups. Any filler, as well as any optional additives and auxiliaries, can be mixed with either or both of the isocyanate component and the isocyanate-reactive component but is preferably mixed with both components. The components may be mixed by any of various known methods, including impingement mixing and static mixing, and they may be applied to the substrate to be bonded as thin films or in the form of beads.

Adhesives prepared according to the invention, although used without primer, exhibit excellent high temperature bonding strength, as measured by the tests described in the examples. Furthermore, the curative component of the invention is particularly resistant to phase separation, whereas polyol blends containing diols other than 2'-methyl-1,3-propanediol are subject to separation. In addition, adhesives according to the invention produce improved high temperature bonding properties when compared with adhesives based on polyol blends containing intermediate equivalent weight polyols instead of mixtures of high equivalent weight polyols and 2-methyl-1,3-propanediol according to the invention.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

DESCRIPTION OF THE PREFERRED EMBODIMENTS

The following isocyanate-reactive compounds were used to prepare polyol blends used in the examples:

Polyether A

A poly(propylene oxide) triol capped with ethylene oxide (equivalent weight 2000) (available as MULTRANOL® 9139 from Bayer Corporation)

Polyether B

An aromatic amine-terminated polyether (equivalent weight 1833) prepared by the hydrolysis of the corresponding aromatic isocyanate-terminated polyether polyol Polyether C A poly(propylene oxide) diol (equivalent weight 1000)

Extender A

2-Methyl-1,3-propanediol

Extender B 1,4-Butanediol

Extender C

Ethylene glycol (1,2-ethanediol)

Extender D

Propylene glycol (1,2-propanediol)

Extender E 1,6-Hexanediol

Extender F

1-Amino-3,3,5-trimethyl-5-aminomethylcyclohexane (IPDA)

Extender G

Ethylenediamine-started poly(propylene oxide) tetraol (i.e., a crosslinker) (equivalent weight 89) (available as MULTRANOL® 4050 from Bayer Corporation)

Extender H

Amine-terminated polyether (equivalent weight 200) (available as JEFFAMINE® D-400 from Huntsman)

The following polyisocyanates were used for the adhesive performance tests of Examples 6–10:

Isocyanate A

A blend of 65 parts of a polymeric diphenylmethane diisocyanate (NCO content of about 31.5%, NCO functionality of about 2.7, and viscosity of 180 mPa.s at 25° C.) and 35 parts of an isocyanate prepolymer (NCO content of about 10%, NCO functionality of about 2, and viscosity of 10,000 mPa.s at 25° C.; prepared by reaction of diphenylmethane-4,4'-diisocyanate with a poly(propylene oxide) diol having an equivalent weight of 500)

Isocyanate B

A urethane-modified polyisocyanate having an NCO content of about 23% and a viscosity of 860 mPa.s at 25° C. prepared by reaction of 71.5 parts of a polymeric diphenylmethane diisocyanate (2,4'-isomer content of about 19% and NCO functionality of about 2.4) with 27 parts of polyether A

EXAMPLES 1–5

Phase Stability Evaluations

A series of polyol blends were prepared to determine the relative phase stabilities of blends containing various ratios of 2-methyl-1,3-propanediol and various other alkanediols.

Phase stability was determined by room temperature appearance (Examples 1–3) and by cloud point measurements (Examples 4 and 5), which allow a numerical valuation of degree of phase stability.

Comparison tests were conducted by using an equivalent ratio of extender to 2-methyl-1,3-propanediol greater than 0.6 (i.e., comparison Examples 2b, 2c, 3b, 4b, 4c, 5b, and 5c) or by omitting 2-methyl-1,3-propanediol altogether (i.e., comparison Examples 1a, 2a, 2g, 2h, 2i, 3a, 4a, 4f, 4g, 4h, and 5a).

Appearance Tests

Phase stabilities determined by appearance at room temperature are reported using the following scale:
(1) Clear and homogeneous
(2) Cloudy and homogeneous
(3) Formation of two layers
(4) Solid/liquid mixture Formulations and results are shown in Tables 1–3. Quantities are given in parts by weight.

TABLE 1

| Components | Example 1a (comp) | 1b |
|---|---|---|
| Polyether A | 71.5 | 71.5 |
| Polyether B | 14.7 | 14.7 |
| Extender A | — | 17.5 |
| Extender B | 17.5 | — |
| Equiv. ratio Ext. B/Ext. A | — | 0 |
| Appearance | | |
| 1 day | 2 | 1 |
| 14 days | 3 | 1 |

TABLE 2

| Components | 2a (comp) | 2b (comp) | 2c (comp) | 2d | 2e | 2f | 2g (comp) | 2h (comp) | 2i (comp) |
|---|---|---|---|---|---|---|---|---|---|
| Polyether A | 71.5 | 71.5 | 71.5 | 71.5 | 71.5 | 71.5 | 71.5 | 71.5 | 71.5 |
| Extender A | — | 4.5 | 8.75 | 13 | 16.5 | 17.5 | — | — | — |
| Extender B | 17.5 | 13 | 8.75 | 4.5 | 1 | — | — | — | — |
| Extender C | — | — | — | — | — | — | 17.5 | — | — |
| Extender D | — | — | — | — | — | — | — | 17.5 | — |
| Extender E | — | — | — | — | — | — | — | — | 17.5 |
| Equiv. ratio(1) Ext. X/Ext. A | — | 2.9 | 1.0 | 0.35 | 0.06 | 0 | — | — | — |
| Appearance | | | | | | | | | |
| 1 day | 2 | 2 | 2 | 1 | 1 | 1 | 2 | 1 | 4 |
| 14 days | 3 | 3 | 3 | 1 | 1 | 1 | 3 | 1 | 4 |

(1)Ext. X refers to Extender B, C, D, or E as appropriate for each example.

TABLE 3

| Components | 3a (comp) | 3b (comp) | 3c | 3d |
|---|---|---|---|---|
| Polyether C | 71.5 | 71.5 | 71.5 | 71.5 |
| Extender A | — | 8.75 | 13 | 17.5 |

TABLE 3-continued

| Components | 3a (comp) | 3b (comp) | 3c | 3d |
|---|---|---|---|---|
| Extender B | 17.5 | 8.75 | 4.5 | — |
| Equiv. ratio Ext. B/Ext. A | — | 1.0 | 0.35 | 0 |
| Appearance | | | | |
| 1 day | 2 | 2 | 1 | 1 |
| 14 days | 3 | 3 | 1 | 1 |

Cloud Point Tests

Cloud points were determined by warming the polyol blends with stirring at a rate of 2° C. per minute and recording the temperature at which the blends became clear. A phase-stable mixture has a cloud point below room temperature. Formulations and results are shown in Tables 4 and 5. Quantities are given in parts by weight.

TABLE 4

| Components | 4a (comp) | 4b (comp) | 4c (comp) | 4d | 4e | 4f (comp) | 4g (comp) | 4h (comp) |
|---|---|---|---|---|---|---|---|---|
| Polyether A | 71.5 | 71.5 | 71.5 | 71.5 | 71.5 | 71.5 | 71.5 | 71.5 |
| Extender A | — | 6 | 8.75 | 11.5 | 17.5 | — | — | — |
| Extender B | 17.5 | 11.5 | 8.75 | 6 | — | — | — | — |
| Extender C | — | — | — | — | — | 17.5 | — | — |
| Extender D | — | — | — | — | — | — | 17.5 | — |
| Extender E | — | — | — | — | — | — | — | 17.5 |
| Equiv. ratio[1] Ext. X/Ext. A | — | 1.9 | 1.0 | 0.52 | 0 | — | — | — |
| Cloud point (°C.) | 80 | 50 | 38 | <19 | <19 | 150 | 7 | 35 |

[1]Ext. X refers to Extender B, C, D, or E as appropriate for each example.

TABLE 5

| Components | 5a (comp) | 5b (comp) | 5c (comp) | 5d | 5e |
|---|---|---|---|---|---|
| Polyether C | 71.5 | 71.5 | 71.5 | 71.5 | 71.5 |
| Extender A | — | 6 | 8.75 | 11.5 | 17.5 |
| Extender B | 17.5 | 11.5 | 8.75 | 6 | — |
| Equiv. ratio Ext. B/Ext. A | — | 1.9 | 1.0 | 0.52 | 0 |
| Cloud point (°C.) | 102 | 75 | 57 | 43 | <19 |

The phase stability data in Tables 1–5 show that 2-methyl-1,3-propanediol (i.e., Extender A), whether used alone or mixed with smaller amounts of other chain extenders, forms phase-stable mixtures with the isocyanate-reactive polyethers. The amount of the other chain extenders that can be blended with 2-methyl-1,3-propanediol and still form phase-stable mixtures is, however, somewhat dependent on the composition of the polyether. For example, Example 5d shows that it may be necessary to use smaller relative amounts of other chain extenders when using Polyether C instead of Polyether A. In general, however, phase-stable mixtures can contain up to about 0.6 equivalents of such other chain extenders per equivalent of 2-methyl-1,3-propanediol.

Propylene glycol (i.e, Extender D) produced phase stable blends (see Tables 2 and 4) and acceptable adhesive performance (see Table 6 below) when allowed to cure sufficiently. However, adhesives prepared using propylene glycol cure at a much slower rate than adhesives based on 2-methyl-1,3-propanediol and are thus not recommended.

EXAMPLES 6–10

Adhesive Performance

Adhesive formulations were prepared using the above polyisocyanates and polyol formulations at an isocyanate index of 119 to 144. The resultant adhesives were tested for performance using the lap shear (SAE J1525) test. Test results are shown in Table 6.

Lap Shear Procedure

Sheets of commercial grades of fiber-reinforced plastic ("FRP") (4 in.×9 in.×0.125 in., or about 10 cm×23 cm×0.32 cm) were bonded together using metal spacers to insure a bond thickness of 0.030 inch (about 0.76 mm) and an overlap length of 1 inch (about 2.5 cm). The surface of the FRP was wiped with a dry cloth prior to bonding to remove dust. No other surface preparation was used. Samples prepared using the adhesives of Examples 6–10 were cured in an oven for 60 minutes at 135° C. Test specimens (1 inch, or 2.5 cm, wide) were cut from the cured samples using a diamond tipped saw. Samples were tested at a temperature of 82° C. after conditioning for one hour at 82° C.

EXAMPLE 6

A polyol blend according to the invention was prepared from 71.5 parts of Polyether A, 17.0 parts of 2-methyl-1,3-propanediol (i.e., Extender A), 4.0 parts of Extender F, 1.0 part of Extender G, 1.5 parts of Extender H, 13.3 parts of sodium potassium aluminosilicate in castor oil, and 0.02 parts of an organotin mercaptide catalyst available as TOP-CAT® 190 from Tylo Industries. The polyol blend had an equivalent weight of 217.

Adhesive performance was tested using isocyanate A.

EXAMPLE 7

A polyol blend according to the invention was prepared from 71.5 parts of Polyether A, 17.5 parts of 2-methyl-1,3-propanediol (i.e., Extender A), 4.0 parts of Extender F, 1.0 part of Extender G, 1.5 parts of Extender H, 6 parts of sodium potassium aluminosilicate in castor oil, and 0.02 parts of an organotin mercaptide catalyst available as TOP-CAT® 190 from Tylo Industries. The polyol blend had an equivalent weight of 203.

Adhesive performance was tested using Isocyanate B.

EXAMPLE 8

(Comparison to Example 7)

A comparison polyol blend was prepared according to the method of Example 7 except that 17.5 parts of 1,4-butanediol (i.e., Extender B) were used instead of 2-methyl-1,3-propanediol. The polyol blend had an equivalent weight of 203.

Adhesive performance was tested using Isocyanate B.

EXAMPLE 9

(Comparison to Example 7)

A comparison polyol blend was prepared according to the method of Example 7 except that 12.1 parts of ethylene glycol (i.e., Extender C) were used instead of 2-methyl-1,3-propanediol. The polyol blend had an equivalent weight of 192.

Adhesive performance was tested using Isocyanate B.

EXAMPLE 10

(Comparison to Example 7)

A comparison polyol blend was prepared according to the method of Example 7 except that 14.8 parts of 1,2-propanediol (i.e., Extender D) were used instead of 2-methyl-1,3-propanediol. The polyol blend had an equivalent weight of 198.

Adhesive performance was tested using Isocyanate B.

TABLE 6

Adhesive performance for Examples 6–10

| Example | Isocyanate | NCO Index | Urethane content (%) | 82° C. Lap Shear MPa | Fiber tear (%) |
|---|---|---|---|---|---|
| 6 | A | 144 | 12.6 | 2.99 | 100 |
| 7 | B | 127 | 13.1 | 3.10 | 100 |
| 8 (comp) | B | 127 | 13.1 | 3.63 | 100 |
| 9 (comp) | B | 119 | 13.4 | 3.65 | 100 |
| 10 (comp) | B | 123 | 13.2 | 3.42 | 100 |

The adhesion data show that excellent adhesion character was obtained using phase-stable polyol blends based on 2-methyl-1,3-propanediol (i.e., Examples 6 and 7) as well as the phase-unstable blends containing no 2-methyl-1,3-propanediol (i.e., comparison Examples 8 and 9) and the phase-stable blend containing propylene glycol (Example 10). These data show that phase stability is not predictive of adhesive performance. (As noted above, adhesives prepared using propylene glycol cure at a much slower rate than adhesives based on 2-methyl-1,3-propanediol and are thus not recommended even when phase stable.)

What is claimed is:

1. A two-component untilled polyurethane adhesive having a urethane content of from 10 to 18 percent by weight, based on the weight of nonfilled polyurethane polymer, comprising
   (a) a low-viscosity isocyanate component comprising an organic polyisocyanate having a Brookfield viscosity at 25° C. of less than about 15,000 mPa.s in a quantity sufficient to provide an isocyanate index of about 100 to about 150; and
   (b) a phase-stable, low-viscosity curative component having a Brookfield viscosity at 25° C. of less than about 15,000 mPa.s comprising
      (i) 5 to 50 equivalent percent, based on the total equivalents of amino and hydroxyl groups of component (b), of an isocyanate-reactive polyether having an equivalent weight greater than 500 selected from the group consisting of polyether polyols, polyethers terminated by aromatic amino groups, and mixtures thereof,
      (ii) 30 to 95 equivalent percent, based on the total equivalents of amino and hydroxyl groups of component (b), of 2-methyl-1,3-propanediol, and
      (iii) 0 to 35 equivalent percent, based on the total equivalents of amino and hydroxyl groups of component (b), of one or more chain extenders and/or crosslinkers other than 2-methyl-1,3-propanediol having a molecular weight in the range 32 to 400, with the proviso that the equivalent ratio of component (b)(iii) to component (b)(ii) is no more than about 0.6.

2. An adhesive according to claim 1 wherein the urethane content is from 11 to 16 percent by weight, based on the weight of nonfilled polyurethane polymer.

3. An adhesive according to claim 1 wherein the organic polyisocyanate is (i) one or more diphenylmethane diisocyanate isomers in admixture with a polyphenyl polymethylene polyisocyanate in quantities such that the diphenylmethane diisocyanate isomers comprise about 20 to 100 percent by weight of the total polyisocyanate; (ii) a urethane-, urea-, or allophanate-modified diphenylmethane diisocyanate and/or polyphenyl polymethylene polyisocyanate; (iii) an isocyanate-terminated prepolymer prepared from one or more diphenylmethane diisocyanate isomers and/or a polyphenyl polymethylene polyisocyanate; or (iv) a mixture thereof.

4. An adhesive according to claim 1 wherein component (b)(i) is a polyoxypropylene polyoxyethylene triol having an equivalent weight greater than 500.

5. An adhesive according to claim 1 wherein component (b)(i) is a polyether terminated with aromatic amino groups prepared by reacting a polyether containing two to four hydroxyl groups with an excess of an aromatic polyisocyanate to form an isocyanate-terminated prepolymer and hydrolyzing said isocyanate-terminated prepolymer to form the amine-terminated polyether.

6. An adhesive according to claim 1, wherein component (b)(iii) comprises 0.5 to 35 equivalent percent, based on the total equivalents of amino and hydroxyl groups of component (b), of one or more chain extenders and/or crosslinkers other than 2-methyl-1,3-propanediol, wherein 0.5 to 20 equivalent percent, based on the total equivalents of amino and hydroxyl groups of component (b), of said chain extenders and/or crosslinkers is a diamine and/or triamine.

7. An adhesive according to claim 1 wherein component (b)(i) comprises 5 to 20 equivalent percent of the total equivalents of amino and hydroxyl groups of component (b), component (b)(ii) comprises 70 to 95 equivalent percent of the total equivalents of amino and hydroxyl groups of component (b), and component (b)(iii) comprises 0.5 to 17 equivalent percent of the total equivalents of amino and hydroxyl groups of component (b).

* * * * *